(12) United States Patent
Geibel

(10) Patent No.: US 8,357,295 B2
(45) Date of Patent: Jan. 22, 2013

(54) ADJUSTABLE ANCHOR ROD

(75) Inventor: John L. Geibel, Butler, PA (US)

(73) Assignee: Xylem Water Solutions Zelienople LLC, Zelienople, PA (US)

( * ) Notice: Subject to any disclaimer, the term of this patent is extended or adjusted under 35 U.S.C. 154(b) by 102 days.

(21) Appl. No.: 12/373,143

(22) PCT Filed: Jul. 13, 2007

(86) PCT No.: PCT/US2007/073456
§ 371 (c)(1),
(2), (4) Date: Jan. 9, 2009

(87) PCT Pub. No.: WO2008/008951
PCT Pub. Date: Jan. 17, 2008

(65) Prior Publication Data
US 2009/0269147 A1     Oct. 29, 2009

Related U.S. Application Data

(60) Provisional application No. 60/830,569, filed on Jul. 13, 2006.

(51) Int. Cl.
*B01D 24/22* (2006.01)

(52) U.S. Cl. .......................... 210/293; 405/118; 405/119

(58) Field of Classification Search .......... 405/118–123, 405/284, 286; 404/2, 4, 25, 26; 210/289, 210/293; 52/19, 20, 21
See application file for complete search history.

(56) References Cited

U.S. PATENT DOCUMENTS

| | | |
|---|---|---|
| 5,209,534 A | 5/1993 | Crenshaw et al. |
| 5,318,376 A | 6/1994 | Prescott, Sr. |
| 2004/0031743 A1 | 2/2004 | Roberts et al. |
| 2004/0149641 A1 | 8/2004 | Roberts et al. |
| 2004/0201115 A1 | 10/2004 | Sebastiani et al. |
| 2005/0194302 A1 | 9/2005 | Roberts et al. |
| 2006/0113234 A1 | 6/2006 | Roberts et al. |
| 2006/0175251 A1 | 8/2006 | Roberts |
| 2006/0272679 A1 | 12/2006 | Roberts et al. |
| 2007/0023346 A1 | 2/2007 | Roberts |
| 2007/0039867 A1 | 2/2007 | Roberts et al. |
| 2007/0235382 A1* | 10/2007 | Roberts et al. ............... 210/293 |

FOREIGN PATENT DOCUMENTS

GB      2176523      * 12/1986

* cited by examiner

*Primary Examiner* — Sean Andrish
(74) *Attorney, Agent, or Firm* — The Webb Law Firm, P.C.

(57) ABSTRACT

An adjustable anchor rod arrangement for use with an underdrain system that includes the a pair of spaced apart legs and an elongated member adjustably attached to the legs, wherein the legs are adjustable along a longitudinal axis of the elongated member and the elongated member is adjustable along a longitudinal axis of the legs.

1 Claim, 6 Drawing Sheets

US 8,357,295 B2

ADJUSTABLE ANCHOR ROD

CROSS REFERENCE TO RELATED APPLICATIONS

This application claims the benefit of U.S. Provisional Application No. 60/830,569 entitled "Adjustable Anchor Rod," filed on Jul. 13, 2006, which is hereby incorporated by reference.

BACKGROUND OF THE INVENTION

1. Field of the Invention

The present invention relates to anchors which are used for holding a filter underdrain block in a water or wastewater treatment filter of an underdrain system.

2. Description of Related Art

Anchors specifically suited for embedment in grout, between filter underdrain blocks on the bottom of water and wastewater treatment filters, are well known. Grout is used to fill the space between two rows of interconnected underdrain blocks, known as underdrain laterals.

FIG. 1 shows a prior art anchor rod 2 installed in a filter floor 12 adjacent an underdrain block 14 of an underdrain system 4. Referring to FIG. 1, the underdrain block 14 spans a channel or flume 16, which channel 16 is used to introduce backwash water to the underdrain block 14, is well known in the art. The underdrain block 14 has lugs 18 on a side thereof for securing the underdrain block 14 in a bed of grout G. Generally, the prior art anchor rod 2 consists of a single bent steel-reinforcing rod made in the shape of a "U". The prior art U-shaped anchor rod 2 has spaced apart vertical legs 6 and a horizontal bar 8 defined therebetween, wherein the legs 6 extend downwardly and are embedded in the grout G between adjacent underdrain laterals, and secured to the filter floor 12. The filter floor 12 is typically made of either concrete or steel. More specifically, the U-shaped anchor rod 2 is typically located over the channel 16 (flume) in the filter floor 12, but can be located anywhere in the filter floor 12, which channel 16 allows backwash water to flow into openings in a bottom of the underdrain that span the channel 16. Because of the water pressure exerted against the bottom of the underdrain, and from water entering the underdrain out of the channel anchors such as the prior art U-shaped anchor rod 2 are required to hold the underdrain down. The horizontal bar 8 of the U-shaped rod 2 must be above the lugs 18 in the grout G in order to put the grout G between the horizontal bar 8 and the lugs 18 in compression. This is the most effective location for hold-down strength against uplifting forces.

There are several drawbacks to the prior art one piece U-shaped anchor rod 2. First, the underdrain must be installed level regardless of variations in the floor elevation. In situations where the underdrain is at a higher elevation over the channel or other locations on the filter floor, the fixed vertical dimension of the anchor rod 2 makes it impossible to maintain both a minimum embedment or attachment of the vertical legs 6, while at the same time assuring correct elevation of the horizontal bar 8 relative to the lugs 18 of the underdrain system 4. Second, if the vertical legs 6 of the anchor rod 2 are made extra long to accommodate variable elevations, sometimes the legs 6 will have to be cut or holes made deeper in the filter floor 12. Third, the prior art anchor rod 2 does not allow the vertical legs 6 to be rotated when installed using an adhesive, which is preferred by adhesive manufacturers for proper installation of the U-shaped rods.

It is an object of the present invention to overcome the aforesaid drawbacks of the prior art anchor rod 2. Particularly, it is an object of the invention to allow for rotation of the legs 6 of the anchor rod 2 upon installation, as suggested by adhesive manufacturers. It is a further object to provide for adjustment of an anchor rod arrangement to the finished, correct elevation relative to the underdrain before backfilling with grout.

SUMMARY OF THE INVENTION

The present invention provides for an adjustable anchor rod arrangement for use with an underdrain system that includes a pair of spaced apart legs and an elongated member adjustably attached to the legs, wherein the legs are adjustable along a longitudinal axis of the elongated member and the elongated member is adjustable along a longitudinal axis of the legs.

DETAILED DESCRIPTION OF THE INVENTION

Figure 1:
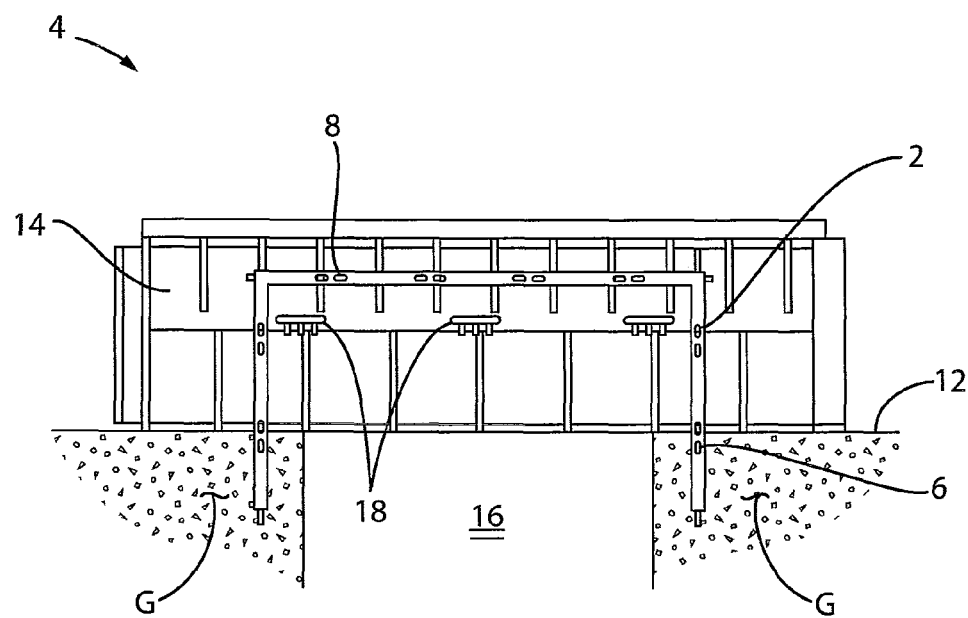
FIG. 1 is an elevational view showing a prior art U-shaped anchor rod installed in a filter floor over a flume channel and adjacent an underdrain block.
Figure 2:
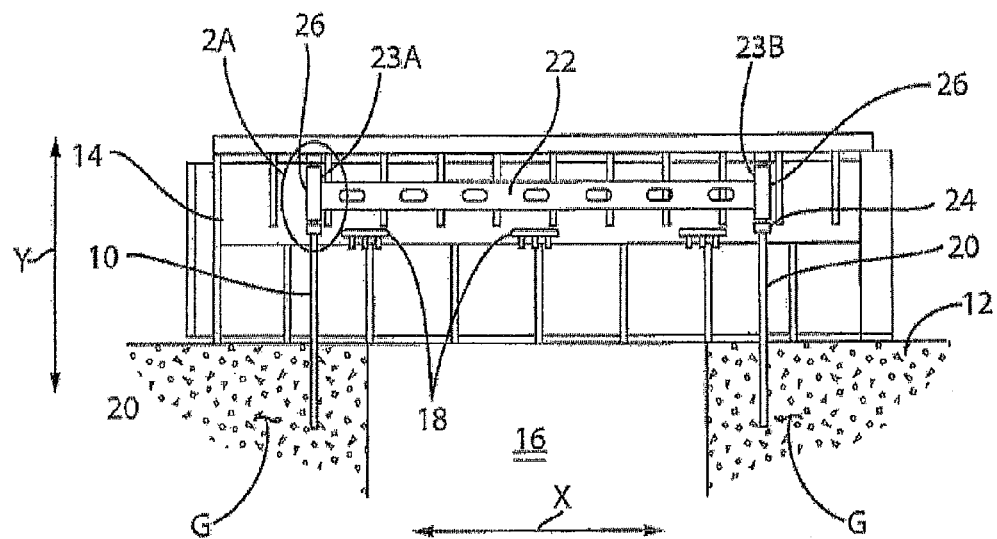
FIG. 2 is an elevational view of an adjustable anchor rod arrangement according to the present invention, installed in a filter floor over a flume channel and adjacent an underdrain block.

FIG. 2 shows an adjustable anchor rod arrangement 10 according to the present invention installed in a filter floor 12 adjacent an underdrain block 14 in a manner similar to the installation of the prior art anchor rod 2 shown in FIG. 1. Like reference numerals are used for like parts. Referring to FIG. 2, underdrain block 14 spans a channel 16, which channel 16 is used to introduce backwash water to the underdrain block. The underdrain block has lugs 18 on a side thereof, for securing the underdrain block in a bed of grout G.

Figure 2A:
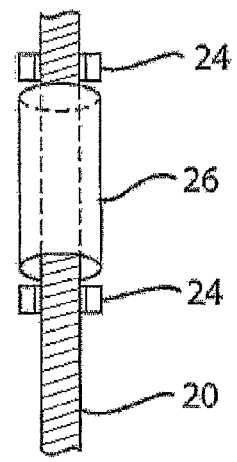
FIG. 2A is an exploded view of section 2A of the adjustable anchor rod arrangement shown in FIG. 2.
Figure 3A:
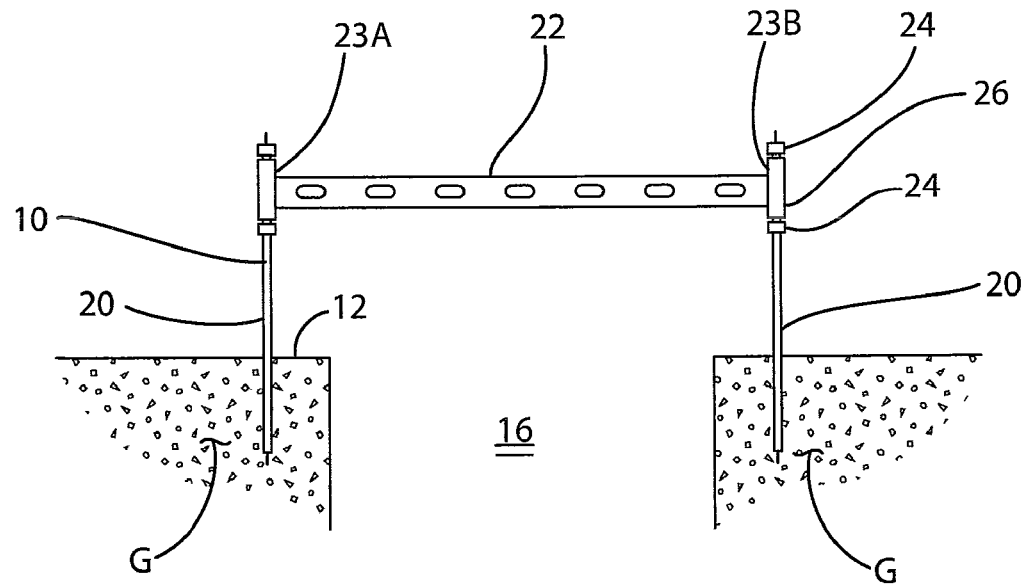
FIG. 3A is an isolation view of the adjustable anchor rod arrangement shown in FIG. 2, installed in a filter floor over a flume channel.
Figure 3B:
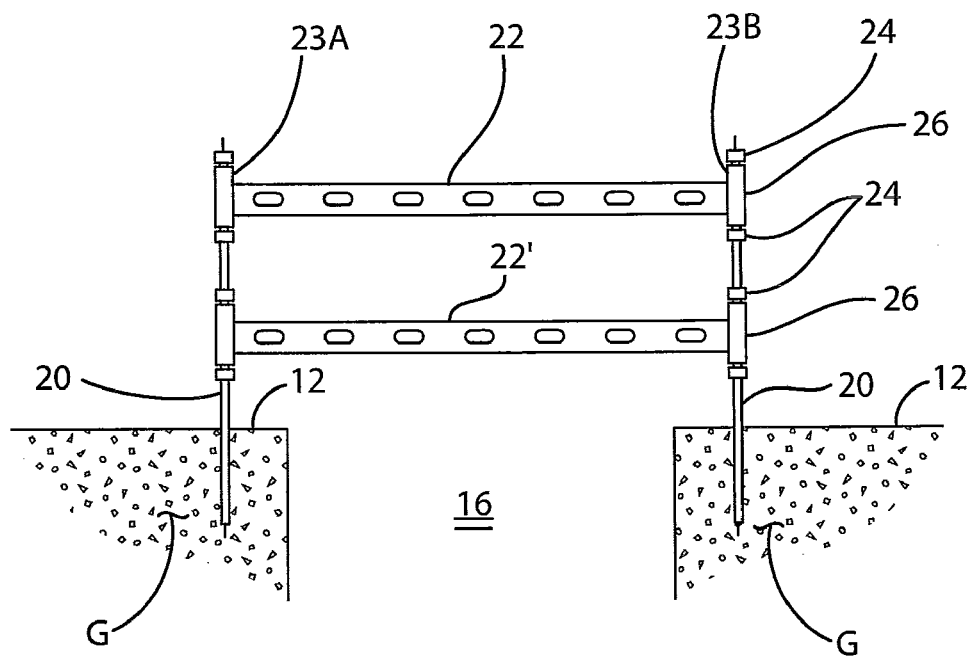
FIG. 3B is an isolation view of a second embodiment of an adjustable anchor rod arrangement according to the present invention, installed in a filter floor over a flume channel.

Referring to FIGS. 2, 2A and 3A, the adjustable anchor rod arrangement 10 comprises a pair of spaced apart legs 20 which are preferably constructed of all-thread rod (e.g., ⅜ inches in diameter) and which are long enough to ensure that any variations in the levelness of filter floor 12 can be accommodated. For example, the threaded rods having a length of 17 inches will be generally suitable for this purpose. An elongated member 22 such as a bar having a first end 23A and a second end 23B spans between the legs 20. A bore 26 is defined adjacent each end 23A and 23B of the elongated member 22, wherein the bore 26 receives the legs 20, thereby adjustably attaching the legs 20 to the ends 23A and 2313 of the elongated member 22. The anchor rod arrangement 10 is such that the legs 20 are adjustable along a longitudinal axis X of the elongated member 22 and the elongated member 20 is adjustable along a longitudinal axis Y of the legs 20. The legs 20 are then secured to the elongated member 22 using a fastener 24 such as a hex nut or other means positioned above and below the bore 26 on the elongated member 22. Other adjustable securement arrangements may be envisioned by those skilled in the art and are deemed to be within the scope of the present invention. For example, the bore 26 can be internally threaded for threadably receiving the threaded rods or legs 20. The elongated member 22 can be any geometric shape such as a flat or circular shaped bar. As shown in FIG. 3B, the anchor rod arrangement 10 may include a plurality of spaced apart elongated members 22 and 22' adjustably attached to the legs 20 for additional strength requirements. The anchor rod arrangement 10 can be made of corrosion resistant metal such as stainless steel.

Figure 4:
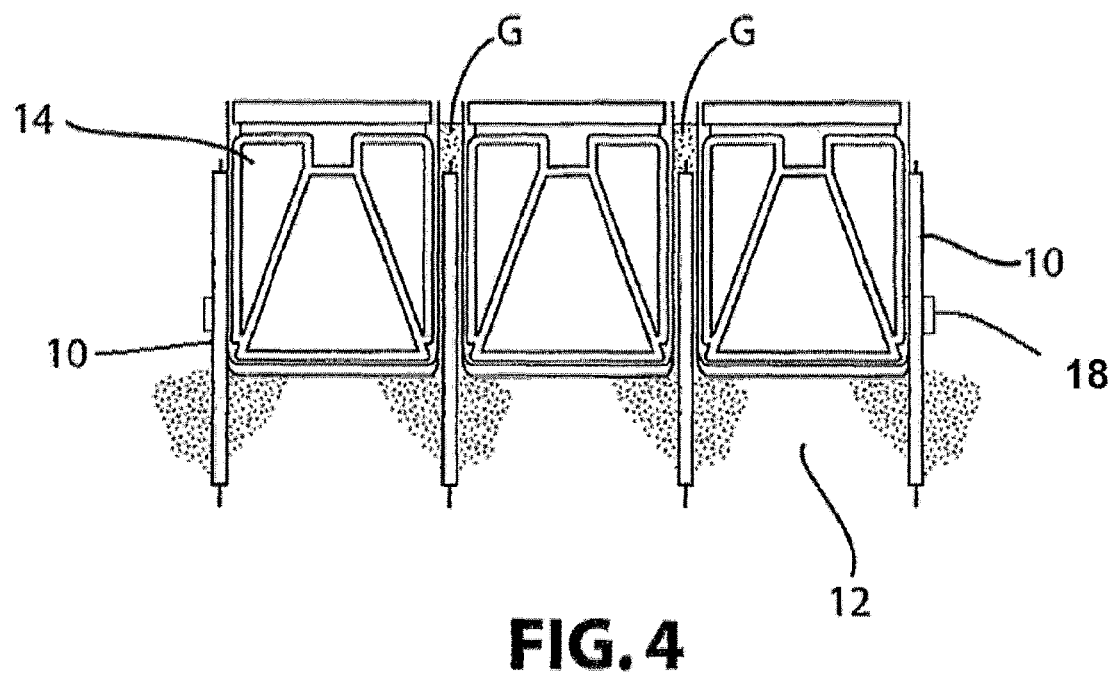
FIG. 4 is an end view of a plurality of underdrain laterals, showing grout between the underdrain laterals with adjustable anchor rods according to the present invention installed in the grout.

Referring to FIG. 4, a plurality of anchor rod arrangements 10 may be seen, each located between adjacent underdrain blocks 14 and embedded in grout G. The purpose of the multiple anchor rod arrangements 10 is to hold down the underdrain blocks 14 against pressure exerted on them from beneath due to the introduction of backwash water from channel 16 into the underdrain blocks 14.

Figure 5:
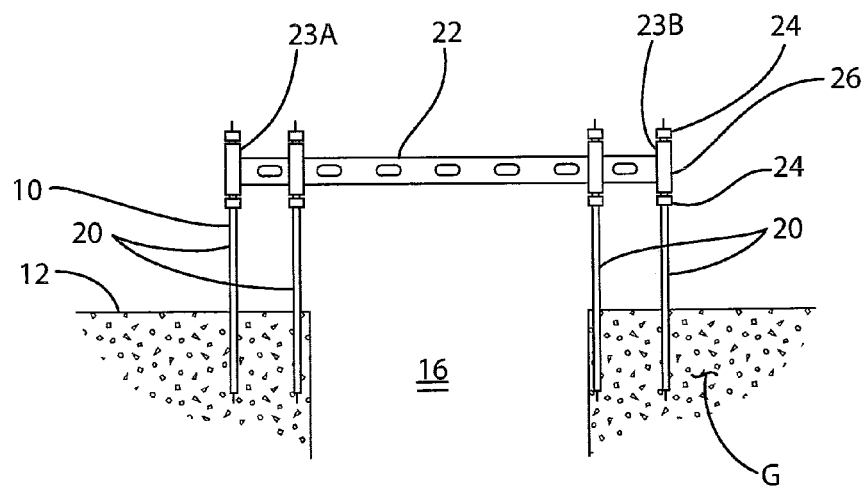
FIG. 5 is an isolation view of a third embodiment of an adjustable anchor rod arrangement according to the present invention, installed in a filter floor over a flume channel.
Figure 6:
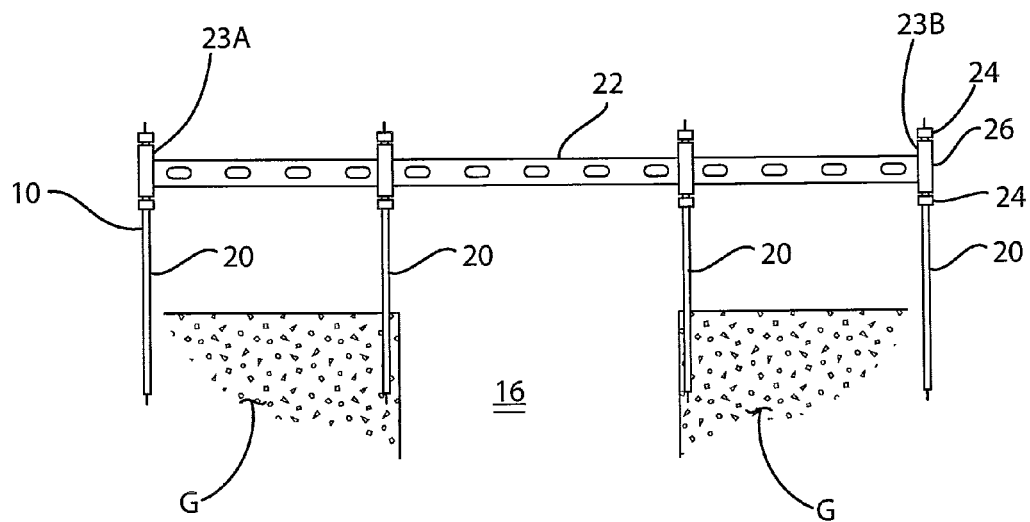
FIG. 6 is an isolation view of the adjustable anchor rod arrangement shown in FIG. 5 having spaced apart legs.

Referring to FIGS. 5 and 6, the anchor rod arrangement 10 may include a plurality of spaced apart legs 20, which legs 20 can be spaced at various distances from each other, adjustably attached to a single elongated member 22 for specific strength requirements.

Figure 7:
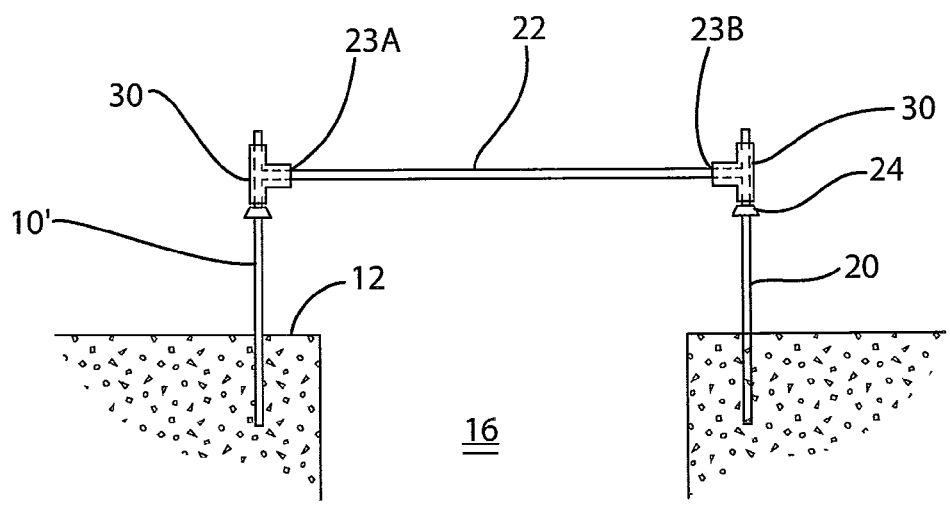
FIG. 7 is an isolation view of a fourth embodiment of an adjustable anchor rod arrangement according to the present invention, installed in a filter floor over a flume channel.

FIG. 7 shows another embodiment of an anchor rod arrangement 10' according to the present invention. The anchor rod arrangement 10' is similar to arrangement 10 except that a hollow tee-shaped member 30, such as a pipe tee, is adjustably attached to each end 23A and 23B of the elongated member 22 and to each of the legs 20. The tee-shaped member may also be internally threaded for threadably attaching each leg 20 to the elongated member 22. Other adjustable attachment means may be used such as a fastener or other means positioned above and below the tee-shaped member 30. The anchor rod arrangement 10' can be fabricated using standard or off-the-shelf items in a retail hardware store thereby making assembly and/or fabrication, easier thus reducing cost.

The adjustable anchor rods 10 are installed as follows. First, the legs 20 are embedded in a raw filter floor 12. Next, a layer of base grout G is placed on the filter floor 12, in order to create a level surface. The underdrain blocks 14 are then set in the base grout one row at a time. Alternative installation procedures may be used to arrive at this step. Particularly, after each row of underdrain blocks is set, the elongated members 22 on that row's adjacent set of anchor rod arrangements 10 are installed. The height of the elongated members 22 is adjusted by turning the fastener 24 or other attachment means accordingly. Preferably, the height of the elongated member 22 is adjusted so that it is roughly 1½ inches above the lugs 18 on the adjacent underdrain block 14. In addition, more than one elongated member 22 and 22' may be added to improve the joint strength as shown in FIG. 3B.

Next, the following row of underdrain blocks 14 is positioned on the base grout (after the height of the elongated members 22 has been properly adjusted). When the following row of underdrain blocks 14 is completed (and any final adjustments made on the elongated member 22), grout G is then backfilled in between the rows of underdrain blocks to encase the elongated members 22 and legs 20 of the adjustable anchor rod arrangements 10. The elongated members 22 upon drying of the grout G, will put the grout G in compression and shear with respect to lugs 18. This holds the lugs 18 and the underdrain block 14 in place when uplift forces are exerted on the underdrain block 14 from backwash water in flume 16 or other possible significant uplift forces on blocks located in other parts of the filter floor. The adjustability of the elongated member 22 in the present invention is particularly advantageous because the underdrain blocks 14 positioned over channel 16, although always level, may be higher than if they were rested directly on a raw filter floor 12. This increased elevation of the underdrain blocks 14 is due to the layer of grout (not shown) which is normally placed on the filter floor 12 before the underdrain blocks 14 are set thereon.

Regarding installation of legs 20 in filter floor 12, an epoxy is normally used. Particularly, holes are drilled in filter floor 12 and filled with the epoxy. The legs 20 are then inserted into the epoxy with a twisting motion, as recommended by the epoxy manufacturer. This twisting motion is not currently possible with the existing prior art U-shaped anchor rods shown in FIG. 1.

The elongated member 22 may be but need not be manufactured from corrosion resistant metal such as stainless steel. This is because the elongated members 22 are embedded in the grout G and, therefore, not touching the water which is being treated in the treatment filter. Also, the adjustable anchor rod arrangement 10 may be useful in other locations of the filter floor 12, apart from the channel 16, to further secure the underdrain blocks 14 in place.

Other variations and additions may be made to the presently described embodiments of an adjustable anchor rod arrangement without departing from the spirit and scope of the present invention.

The invention claimed is:

1. A method of installing an anchor rod arrangement in an underdrain system, the method comprising:
   providing a first layer of grout over a filter floor;
   providing a pair of adjacent underdrain blocks on the first layer of grout, wherein the pair of underdrain blocks are spaced from one another and the pair of adjacent underdrain blocks have lugs;
   providing an anchor rod arrangement comprising a first leg having a first end and an opposite second end, a second leg having a first end and an opposite second end, and an elongated member, the elongated member having a first end portion mounted on the first leg and an opposite second end portion mounted on the second leg;
   providing a securing arrangement mounted on the first leg and the second leg to secure the first end portion and the second end portion of the elongated member in position on the first leg and the second leg, respectively, wherein the securing arrangement comprises a first fastener mounted on the first leg between the first end of the first leg and the first end portion of the member, a second fastener mounted on the first leg between the second end of the first leg and the first end portion of the member, a third fastener mounted on the second leg between the first end of the second leg and the second end portion of the member, and a fourth fastener mounted on the second leg between the second end of the second leg and the second end portion of the elongated member;
   adjusting the fasteners to adjust the height of the elongated member on the first and second legs such that the elongated member is out of contact with the lugs securely mounting the second end of the first and the second legs in the filter floor between the pair of adjacent underdrain blocks;

adjusting the securing arrangement to position the elongated member out of contact with the lugs of each of the underdrain blocks by spacing the elongated member at a predetermined distance from the lugs, wherein the lugs are between the filter floor and the elongated member; and applying a second layer of grout between the pair of underdrain blocks to encase the lugs, the elongated member and the legs in the second layer of grout with portions of the second layer of grout between the elongated member and the lugs, wherein the grout between the elongated member and the underdrain blocks is in compression and shear with respect to the lugs to hold the pair of underdrain blocks in place when uplift forces are exerted on the pair of underdrain blocks.

* * * * *

UNITED STATES PATENT AND TRADEMARK OFFICE
CERTIFICATE OF CORRECTION

PATENT NO.         : 8,357,295 B2
APPLICATION NO. : 12/373143
DATED              : January 22, 2013
INVENTOR(S)       : John L. Geibel It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 207 days.

Signed and Sealed this

First Day of September, 2015

Michelle K. Lee
*Director of the United States Patent and Trademark Office*